(12) United States Patent
Shuff

(10) Patent No.: US 12,043,420 B2
(45) Date of Patent: Jul. 23, 2024

(54) DRONE, DRONE DOCKING PORT AND METHOD OF USE

(71) Applicant: Greg Douglas Shuff, Henderson, NV (US)

(72) Inventor: Greg Douglas Shuff, Henderson, NV (US)

( * ) Notice: Subject to any disclaimer, the term of this patent is extended or adjusted under 35 U.S.C. 154(b) by 127 days.

(21) Appl. No.: 17/903,125

(22) Filed: Sep. 6, 2022

(65) Prior Publication Data

US 2023/0002082 A1 Jan. 5, 2023

Related U.S. Application Data

(63) Continuation-in-part of application No. 16/802,585, filed on Feb. 27, 2020, now abandoned.

(51) Int. Cl.

| | |
|---|---|
| *B64U 70/50* | (2023.01) |
| *B60L 53/12* | (2019.01) |
| *B60L 53/14* | (2019.01) |
| *B64F 1/36* | (2017.01) |
| *B64U 50/19* | (2023.01) |
| *B64U 80/00* | (2023.01) |
| *B64U 80/20* | (2023.01) |
| *B64U 101/30* | (2023.01) |
| *B64U 70/00* | (2023.01) |

(52) U.S. Cl.
CPC .............. *B64U 70/50* (2023.01); *B60L 53/12* (2019.02); *B60L 53/14* (2019.02); *B64F 1/362* (2013.01); *B64U 80/20* (2023.01); *B60L 2200/10* (2013.01); *B64U 50/19* (2023.01); *B64U 70/00* (2023.01); *B64U 80/00* (2023.01); *B64U 2101/30* (2023.01)

(58) Field of Classification Search
CPC ........ B64U 80/20; B64U 80/25; B64U 80/40; B64U 80/00; B64U 70/50; B64U 70/00; B64U 70/97
See application file for complete search history.

(56) References Cited

U.S. PATENT DOCUMENTS

| | | | |
|---|---|---|---|
| 2017/0139424 A1* | 5/2017 | Li | G06Q 10/083 |
| 2018/0137767 A1* | 5/2018 | Hou | G08G 5/025 |

(Continued)

FOREIGN PATENT DOCUMENTS

CN 208412100 U * 1/2019 ............. B64C 25/02

*Primary Examiner* — Timothy D Collins
*Assistant Examiner* — Justin Michael Heston
(74) *Attorney, Agent, or Firm* — Bayramoglu Law Offices LLC

(57) ABSTRACT

A drone docking ports (DDP) mounted on a pole top in close proximity to an accident scene with an openable and closable enclosure, a docking plate having integrated battery wired or wireless recharging pads, and a control module (CM) is disclosed. The CM is adapted to autonomously control all functions of the DDP including actuation of the enclosure and relay of video, audio, and flight control information between the CM and a central monitoring center and/or emergency personnel. A drone with a top and bottom profile design allowing numerous drones to be stacked upon one another and store in the DDP. When the DDP enclosure is in an open position, a drone or stack of drones may initiate a flight from the DDP and to re-dock the drone or stack of drones when the flight is completed, the enclosure may be closed to protect the drone or stack of drones.

10 Claims, 16 Drawing Sheets

(56) References Cited

U.S. PATENT DOCUMENTS

2020/0003529 A1* 1/2020 Benezra ................. B64U 50/30
2020/0217468 A1* 7/2020 Brown .................... H04W 4/38
2021/0031947 A1* 2/2021 Wankewycz ............ B60L 50/60

* cited by examiner ated and a drone or drones has re-docked therein, the enclosure may be closed so as to protect the drone or drones docked therein from external weather. The DDP may further include EO/IR (Electro-Optical/Infra-Red) cameras and sensors so as to detect disruptive or other predetermined behavior.

DRONE, DRONE DOCKING PORT AND METHOD OF USE

CROSS REFERENCE OF THE RELATED APPLICATION

The present invention is a continuation-in-part (CIP) application of U.S. non-provisional application Ser. No. 16/802,585, filed on Feb. 27, 2020, the entire contents of which are incorporated herein by reference.

TECHNICAL FIELD

The present invention relates to docking for the facilitation of takeoff, landing and housing of drones or unmanned aerial vehicle (UAV), and more especially for drones or UAVs used in traffic control and border security and the like applications and in acquiring, storing and transmitting information regarding the same.

BACKGROUND

Many accidents occur in the US. The Insurance Information Institute reports total accidents in the U.S. for 2017 at 6,452,000 resulting in approximately 1,889,000 injuries, 34,247 deaths and $4,530,000 in property damage. The cost to respond by police, fire departments and cleanup crews to these accidents is substantial, as is the cost in terms of time and fuel consumed by drivers delayed by these accidents. Moreover, time is typically of the essence in such scenarios. Present methods of deploying drones or UAVs for specific operations, such as to observe traffic incidents or security breaches generally require drones to be physically transported to locations of interest, set up, and launched and controlled by operators with appropriate expertise. This process takes considerable time and effort and can result in missing the window of opportunity to successfully capture the incident or data of interest. Thus, there is a need for timely/efficient approach to the launch, operation and housing of monitoring drones.

SUMMARY

The present invention is a drone and drone docking port (DDP) preferably sized so as to be large enough to house (enclose) a drone or multiple drones but small enough to be mounted on a pole—a fence pole, a street light pole, a roadway sign pole, a traffic light pole, a cell tower pole, a bridge pillar, etc.—and having an openable and closable enclosure, a docking plate having integrated battery wired or wireless recharging pads, and a control module. The control module (CM) is adapted to preferably autonomously control all functions of the DDP including actuation of the enclosure and relay of video, audio, and flight control information between the CM and a central monitoring center and/or emergency personnel. The DDP is preferable positioned in close proximity to an intended monitoring site—e.g. so as to facilitate the rapid launch of a drone to monitor and/or inspect an incident, to provide light on or act as a beacon at the intended site, to act as a traffic signal to control and direct traffic around an incident in a safe, efficient manner, to relay information about the monitored site to a central monitoring center and/or emergency personnel, to emit audible sounds at the site (e.g. warnings or instructions), and for the rapid recovery and docking of the same. When the DDP enclosure is in an open position, a drone or drones may initiate flight from the DDP and when a drone or drones flight is com- More specifically, various embodiments of the DDP and drone are contemplated. In a first embodiment, the DDP includes an enclosure that is openable and closeable by means of a motor mechanism, a docking plate, drone battery recharging pads and/or wireless recharging pad, a control module (CM), and a battery pack. Optional DDP equipment may include solar panels, an air conditioning unit and an anemometer and related weather station equipment. In an inactive state, the DDP enclosure remains in the closed position and preferably fully contains a drone or drones. In response to receipt of a signal from remote sensors, central monitoring center, and/or emergency personnel, or local— e.g. located on the DDP and/or in the nearby vicinity of the DDP and a potential incident—the DDP activates, thereby opening to expose the drone and allows for drone take-off and manual or autonomous flight directly to and hover above the incident (preferably with FAA (Federal Aviation Administration) authorization).

The DDP preferably includes an enclosure which takes the form of a cylindrical container with two cylindrical halves and an opening/closing mechanism, containing a drone or multiple drones in a stack. The DDP enclosure contains all devices and equipment necessary for manual or autonomous drone deployment and drone battery recharging, and to protect the drone from the outside environment while stored (in the inactive state). Furthermore, the DDP enclosure is preferably attached to an inverted support cone which is attached to the top of a pole where it may remain for the service life of the DDP.

Preferably the DDP enclosure comprises a cylindrical container (CC) with two cylindrical halves and an opening/ closing mechanism comprising two support/actuator rods securely affixed to the DDP base plate with rod hinges of one support/actuator rod attached to one of the cylindrical halves, and the other support/actuator rod hinges to the other cylindrical half. The support/actuator rods provide sufficient support in high wind conditions and are attached to the cylindrical halves and an opening/closing motor with gears to open and close each cylindrical half in a rapid, synchronized motion. The opening/closing motor is firmly affixed to the DDP base plate underside. In the inactive state, the edges on one cylindrical half have a mating edge with weather stripping, so that when the two cylindrical halves close, the edges come together and mate, also mating with the DDP base plate, to compress the weather strips to form a weather tight seal from the outside environment, and enclose the drone or multiple drones in a stack. In the active state, the opening/closing motor is activated, the support/actuator rods are turned, opening the two cylindrical halves, exposing the drone or multiple drones in a stack to the outside environment and once the enclosure or cylindrical halves are fully open, the drone or multiple drones can manually or automatically be deployed to a target monitoring site.

The DDP preferably includes a docking plate that comprises of a metal, plastic or fiberglass plate that is formed to fit the drone bottom surface profile in such a manner as to allow the landing drone to easily land and slide into place upon initial contact with the docking plate. The docking plate preferably includes drone recharging pads or a wireless recharging pad adapted such that when a drone is in the docked or nested position, the recharging pads will make contact with recharging contacts located on the drone or the wireless recharging pad will be in close proximity to the drone's wireless recharging pad. Preferably the drone bottom surface profile and top surface profile are similar, flat surface with curved surface edges, such that a second landing drone bottom surface profile will mate with the first docked drone top surface profile in such a manner as to allow the landing drone to easily land and slide into place upon initial contact with the previously docked drone. Preferably recharging pads located around the drone periphery top and bottom curved surfaces allow wired charging from the docking plate to a first docked drone, then to a second docked drone, then a third, and forth, and so on, to the top docked drone. Preferably the DDP includes wireless charging from the docking plate and cylindrical halves.

The DDP preferably includes a control module (CM) that controls all aspects of the DDP including enclosure opening and closing, drone battery recharging and communications with other traffic sensor systems, central monitoring stations, first responder personnel and the relay communications to the drone in flight and/or with other drones in flight in the near vicinity. The CM may relay video signals to a central monitoring center and may provide for video recording at or in close proximity to the CM. The CM may also relay flight or camera control signals and audio commands from a central monitoring center to a drone in flight enabling central monitoring center personnel to override autonomous drone flight control should they desire. For example, the CM may receive a traffic alert from a Traffic Flow Sensor System (TFSS) of a nearby traffic accident. The TFSS is a separate device and consists of Electro-Optical/Infra-Red (EO/IR) video, stereo pair video, lidar and/or radar sensors and any combination thereof and detects and monitors traffic flow and abnormal traffic flow to include traffic incidences. Upon the TFSS issuing a traffic alert or accident indication and preferably upon approval by a central monitoring center and the FAA, the CM initiates a signal to the DDP to open the enclosure and to initiate (preferably autonomous) flight of a drone housed therein so as to enable flight and hovering of the drone over the accident, to take photographs and videos of the scene, to assist in accident scene forensics, to act as a traffic signal control with red, yellow and green signal lights so as to direct traffic around an incident in a safe, efficient manner, and to assist police in clearing the scene more rapidly so as to resume normal traffic flow. Central monitoring center personnel are provided the ability to override the (preferably autonomous) drone on demand so as to aid in the resolution and clearing of a traffic incidence. Designated emergency personnel with first-hand knowledge of the incident may also have the ability to override the (preferably autonomous) drone on demand so as to aid in the resolution and clearing of traffic incidence through their portable communications devices or cell phone apps at the incident scene. Communication with the DDP and drone may be made through the use of Bluetooth communication, LoRa Communication, internet communication, cell phone network communication (4G/5G), independent intranet network communication, RF communication, wired communication, and optic fiber communication. Data, video, audio and remote control commands are preferably communicated or streamed in real time with very low latency in both directions—to and from the deployed drone, DDP and central monitoring center. In the event of a malfunction, a malfunction signal or code is sent to the central traffic control monitoring center for resolution.

The DDP preferably includes a Battery Pack installed in the DDP enclosure base or within a support pole upon which the DDP is mounted, providing backup electrical power to all components on the DDP, preferably for a period of 36 hours, in the event of an electrical power disruption and/or solar panel malfunction or cloud coverage. The CM monitors electrical power, solar panels and battery pack status and in the event of electrical power disruption, preferably immediately switches power from the main source to the battery pack and resumes normal operations preferably for a period up to 36 hours and will operate on battery power during at least one enclosure opening and closing and preferably during continuous drone battery recharging for at least 2 hours. In the event of a malfunction, the CM will forward a malfunctioning code to the central monitoring center for resolution and the battery pack would be recharged from local grid electric power or from solar panels in order to resume normal operations.

The DDP preferably includes a microphone and is enabled to detect useful information (e.g. traffic horns, wheel sketching, vehicle collisions, etc.) and relay such information to a central traffic control monitoring center for resolution.

Preferably, if the DDP malfunctions, the CM switches the DDP to work in the inactive mode, and transmits a malfunction code to a central monitoring center for resolution.

The DDP preferably further includes a support structure such as a pole upon which the DDP is mounted. The electrical power wiring and any other wiring from sensors, battery pack or the like are preferably enclosed within the support pole.

Preferably, the DDP and autonomous drone are in an inactive mode more than they are in an active mode. In the event of a (preferably nearby) incident or accident as detected by local or remote sensors, the (preferably autonomous) drone will be deployed. Once deployed, the drone will preferably immediately fly to the incident, hover over the incident, take photographs and video of the incident and surrounding scene, audibly communicate with accident victims or emergency personnel, communicate with central traffic control monitoring center operators and/or designated emergency personnel at the scene, and may perform other tasks while at or near the scene, prior to returning the DDP. Tasks, as embodied in various modes, that may be performed by the DDP in cooperation with a drone or stack of drones housed therein include the following:

Mode 1—As a closest drone to an incident, preferably autonomously fly the drone to the accident scene, take video and audio of injured, attempt to help and comfort injured through an audio transmission, transmit video and audio to a central monitoring and control station operator to enable the operator's viewing of the video and listening to the audio so as to asses injury and damage severity. Help direct personnel and resources once on the scene, and video record injury and vehicle damage.

Mode 2—Once mode 1 is complete, mode 2 may be started or the second drone in a stack of drones may be deployed simultaneously to commence mode 2. In mode 2, fly a drone at an appropriate height to capture video of the overall incident scene to include skid marks, etc. so as to help determine the accident cause.

Mode 3—Once modes 1 and 2 are complete, mode 3 may be started or the third drone in a stack of drones may be deployed simultaneously to commence mode 3. In mode 3, hover the drone high enough over the scene to not interfere with personnel and in a position to provide overhead lighting during operations at night.

Mode 4—Once modes 1, 2 and 3 are complete, mode 4 may be started or the fourth drone in a stack of drones may be deployed simultaneously to commence mode 4. In mode 4, fly a drone high so as to function as a beacon for police, emergency personnel and vehicle drivers and passengers, so as to provide an indication of accident location and potential traffic delays.

Mode 5—In mode 5, upon drone low battery indication, fly a drone back to the DDP and preferably autonomously land and recharge the drone batteries.

Mode 6—Enable the support of drones from the stack of drones within the DDP, nearby DDPs and/or drones from emergency vehicles to provide function as an emergency traffic signal and to enable the stopping of traffic and guiding of traffic around an incident. To accomplish this function, drone swarms comprising two or more drones may coordinate traffic signaling. For example, a freeway incident covering several lanes of traffic may require 4 to 6 drones positioned over each lane and high enough above and at a distance for vehicles traveling toward the incident to be directed by signal lights on the drone so as to provide an indication to the traffic to stop, proceed with caution and proceed in specific lanes so as to allow alternate lanes of travel and consistent travel times for all vehicles to skirt the incident. The disclosed drones include cameras having solid state memory recording cards or modules which can be reviewed at a later date so as to possibly determine drone traffic signal violations or accident fault.

Mode 7—Enable the support of drones from DDPs that are in close proximity to incidents or drones that are carried and deployed from police vehicles and/or emergency vehicles so as to observe "rubber neck" drivers at an incident scene. Such drones would be positioned in a stationary (hovering) position high enough so as not to interfere with personnel or clean up procedures and yet in close enough proximity to the incident to observe "rubber neck" drivers with the objective of reducing the time drivers look at the incident and to increasing the attention paid to driving efficiently and safely around the incident so as to possibly significantly reduce vehicle wait times around an accident site. Enable video recordings to be reviewed at a later date so as to possibly determine "Rubber Necking" violations.

Mode 8—Enable the support of drones from the DDPs stack of drones or from other DDPs or from Police, Fire or Emergency vehicles to function as a signal light control at an intersection so as to assist or replace police controlling traffic flow from the center of an intersection, particularly at the end of events such as sporting events, concerts, etc.

Mode 9—Enable the support of drones from the DDPs stack of drones or DDPs in close proximity to an accident or police vehicles and/or emergency vehicles to be controlled autonomously, semi-autonomously or manually by control monitoring station personnel or more preferably by police at the scene. Enable the support of drones to target, track and follow a specific vehicle or person, preferably at sufficient height so as to act as a beacon and so as to provide ground personnel an indication of the tracked vehicle or person location. Enable the support of audio communications such as for police commands.

The DDP preferably includes optional solar panels in case electrical power through the grid is not available. Such solar panels are adapted to capture the Sun's rays so as to provide electrical power for all devices mounted within the DDP including the CM, the DDP enclosure opening/closing Motor, the DDP battery and drone battery, thus creating a completely self-sufficient system.

The DDP preferably includes an optional air conditioning and heating unit that maintains a stable temperature and humidity environment within the DDP when the enclosure is in the closed position. In such case a cooling coil is affixed to the outside of the DDP or on the DDP support pole. As temperature outside the DDP and solar load increases, the air conditioning system is activated and reduces the DDP inner temperature and humidity. As the temperature outside the DDP decreases, the heater is activated and increases the temperature inside the DDP. By such heating and cooling, the DDP interior temperature and humidity are stabilized within an acceptable range so that the batteries within the DDP and drones can be maintained at an optimum temperature to maximize battery performance.

The DDP enclosure may preferably be adjusted by slightly opening the enclosure so that the internal space of the DDP comes into temperature equilibrium with the DDP external space temperature. Under certain conditions, as the temperature outside the DDP and solar load increases, slightly opening the enclosure such that there is a small opening toward the side of the DDP results in a sufficient reduction in temperature so as not to need to use the air conditioning system and to minimize internal moisture from precipitation. The ability to open the enclosure in this fashion is an advantage of the enclosure type.

The DDP preferably includes an optional weather station, environmental sensors and anemometer so as to detect weather conditions including temperature, humidity, wind speed, rain, snow, ice, fog, dust and high winds. Upon detection of a weather condition that would be hazardous to drone flight, particularly a high wind condition, the CM prevents opening of the enclosure and deployment of the drones, and sends an adverse weather signal or code to the central monitoring center for further resolution.

In a first alternate embodiment, the DDP docking plate typically comprises a square or rectangular and flat plate with downward curved surface edges from approximately 1 inch from the surface edge, recharging pads and a target painted thereon. So that upon drone landing or docking the first drone in a stack of drones to land is able to distinguish the target with the on-board cameras and autonomously land the drone on the docking plate in the proper drone docking orientation. Upon landing, the drone has a similar bottom surface profile as the docking plate's top surface profile and once docked will be secured on the docking plate from external events such as high winds, etc. due to the curved edges. The recharging pads on the drone will make contact with the recharging pads on the docking plate allowing the drone's batteries to be recharged. Furthermore the remaining drones in the stack of drones will return to the DDP based on a GPS location and hover above the DDP, observe an orientation of the first landed drone with the drone's on-board camera and proceed to land or dock. Upon landing, the next drone to dock has a similar bottom surface profile as the docked drone's top surface profile and once docked will be secured on the docking plate or docked drone from external events such as high winds, etc. due to the curved edges, and the recharging pads on the drone will make contact with the recharging pads on the docked drone allowing the drone's batteries to be recharged. This process continues until all drones in the stack of drones returns, lands and securely docked within the DDP enclosure. In the event of a drone landing that fails to make contact with the recharging pads, the drone takes off, hovers, reorients, lands, securely docks and begins to recharge batteries. A base plate is located below the docking plate having docking plate support rods to firmly support the docking plate. The DDP control module (CM) and DDP battery pack are mounted on the base plate and underneath the docking plate. The CM controls all aspects of DDP to include opening and closing of the enclosure, recharging the DDP and drone batteries, and communicating with on-board and off-board sensors, central monitoring center and emergency personnel. In an inactive mode, the DDP contains the stack of drones within the enclosure in the Closed position and enclosing the drones from the outside environment, while preferably continuously monitoring and charging the drone batteries. In an active mode, the enclosure opens exposing the stack of drones, the highest or top drone's motors start to allow drone takeoff. Then the next highest drone in the stack motors start to allow drone takeoff, and this process continues until all drones in the stack of drones takeoff. Upon drone return, the drone preferably autonomously positions itself above the DDP for landing, verifies proper orientation with distinguishing marks painted on the docking plate, then descends to the docking plate, lands and recharges its batteries. The second drone to arrive at the DDP for landing, verifies proper orientation with respect to the first docked drone, then descends, lands on the first docked drone and recharges its batteries The process continues until all drones in the stack of drones have landed. Once secure, the enclosure closes to cover the stack of drones and enclose them from the outside environment and reverts to the inactive mode where the drones are docked until the next drone activation after drone's batteries are recharged.

In a fourth alternate embodiment, two cameras located on the bottom of a drone and pointing downward are employed for precision landing maneuvers. One of the docking cameras is designated as the prime camera and other docking cameras are designated as secondary docking camera. The docking camera video is processed through a docking processor module located within the CM which comprises a combination processor defining a video processing unit and neural network having recognition and flight control capability. Upon landing, the drone returns to and hovers above the DDP location, the prime docking camera initially recognizes the orientation symbol on the docking plate, provides flight control signals to the drone for proper orientation, and the secondary docking camera is implemented in a stereo camera mode to provide precise distance and drone location above the docking plate or other landed drones. The processed video provides flight control and guidance necessary for precision landing and docking maneuvers and land on the docking plate and recharging pads and to shut of the drone propellers so as to complete the landing or docking. The docking cameras can further be employed to provide mission video from directly below the drone, as the docking cameras are fixed position cameras and will only provide video from a straight downward perspective.

In a fifth alternate embodiment, a drone has affixed to each exterior side of the drone are multicolor LED lights or LED panel module (LPM) displaying a high illumination—green, yellow, red, blue and/or white lights which are suitable for traffic signals, a blue light as a beacon, and a white light to assist emergency personnel with overhead illumination. When two opposing LPMs display a green or yellow signal light to a first direction of traffic, two 90 degree adjacent LPMs display a red signal light for a second direction of traffic. The signal lights are controlled by an LED light control processor (LCP) within the LPM and the LCP communicates with the drone which in turn communicates with the DDP, and DDP communicates with the central monitoring center and/or emergency personnel located at the scene via remote control units, so that emergency personnel or police can control the traffic signal lights and traffic flow around an incident or accident.

In a sixth alternate embodiment, the LPM also contains cameras on each side of the LPM providing a stereo view and to provide distance and location of vehicles in the flow of traffic and enabling observers to view a direction of traffic and assist in the control of traffic flow around an incident. The camera video communicates with and is processed through the LCP video processing unit within the LPM.

In a seventh alternate embodiment, the drone includes high illumination white LED lights on the bottom of the drone so as to assist emergency personnel by providing overhead illumination.

In an eighth alternate embodiment, multiple drones from the DDP, multiple DDP's or from emergency vehicles coordinate to work synchronously or as a swarm of drones at the scene of an incident to control traffic flow and aid in traffic incident forensics and to replace other drones when other drones are required to recharge their batteries.

In a ninth alternate embodiment, the FAA is advised prior to drone flight through a third-party application (app) to a Low Altitude Authorization and Notification Capability (LAANC) for flight and airspace approval, specifically for flights in Class B, C, D and some Class E airspace around airports. LAANC is powered by a small group of third party dedicated application providers that act as the medium between flight planning and approvals from the appropriate Air Traffic Control. The DDP initially advises the central monitoring center and/or submits a cell phone app for LAANC approval, often within seconds to minutes, and once approved the DDP begins drone deployment procedures. If the point of deployment is within Class G airspace, no LAANC approval is required.

In a tenth alternate embodiment, the DDP contains a multitude of drones or a stack of drones wherein each drone contains recharging pads to allow electrical current to be passed from one drone to another drone and up the stack so that all drone batteries will be recharged either in a serial or parallel fashion, or wirelessly recharged. Each drone may be deployed and operate independently, deployed in rapid succession and operate independently, and/or deployed in rapid succession and operate synchronously or as a swarm of drones.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
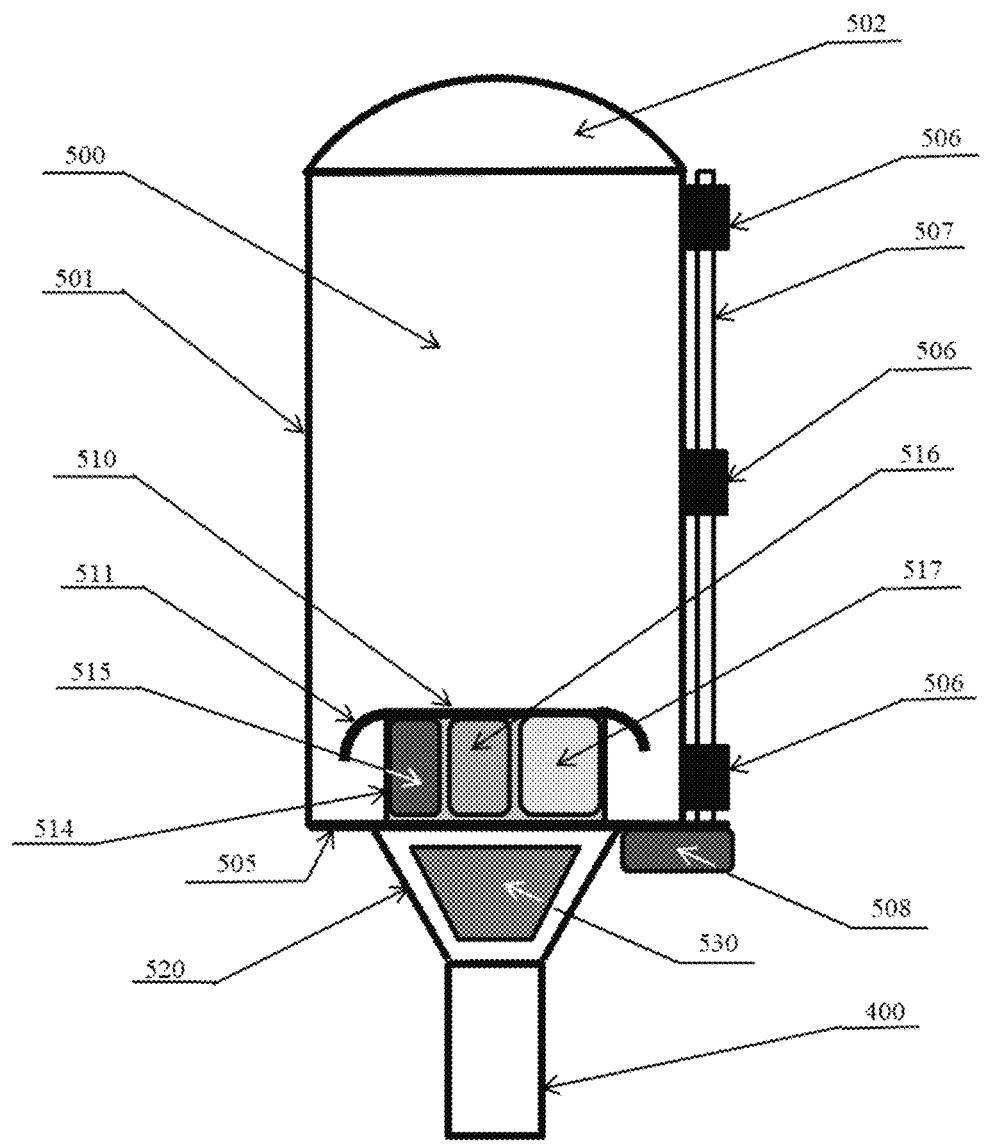
FIG. 1 is a side sectional view of the DDP to include the cylindrical container (CC) in the closed position.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring to FIGS. 1-16, DDP 500 includes DDP cylindrical container 501 or enclosure, cylindrical container half 502&503, DDP base plate 505, container half hinge 506, container support and actuator rod 507, container open/close actuator motor 508, docking plate 510, docking plate curved portion 511, DDP recharging pad 512, docking plate orientation marks 513, control module 515, battery pack 516, optional A/C 517, highway support pole top 400, inverted cone support base 520 and optional support base traffic flow sensor system 530. The docking plate 510 further includes distinguishing and orientation marks 513 to aid docking cameras 620&621 to aid in precise drone docking maneuvers. The drone 600 and drone bottom 614 and drone bottom curved surface 615 is similar in shape to the docking plate 510 and docking plate curved surface 511, and upon docking, the curved surfaces will allow the drone 600 to fall or slip in place making contact with a plurality of recharging pads 613 comprised of a conductive material (e.g. metal or metal foil) located on multiple locations on the bottom curved surface 615 wrapping around the bottom edge to the top curved surface 611 so that the drone's 600 batteries 618 will be recharged while the drone is stored within the DDP 500. The drone 600 and drone top 610 and top curved surface 611 is similar in shape to the docking plate 510, docking plate curved surface 511, drone bottom 614 and drone bottom curved surface 615 and upon docking of a second drone 600 upon the first docked drone, the curved surfaces will allow the second drone 600 to fall or slip in place on the first docked drone, making contact with a plurality of recharging pads 613 of the second drone docking with plurality of recharging pads 612 of the first drone docked. This process is repeated for each drone in the DDP 500. Docking plate support rods 514 are attached to the base plate 505 and docking plate 510, the space between the base plate 505 and docking plate 510 contain the DDP control module (CM) 515, DDP battery pack 516 and optional A/C module 517. CM 515 controls all aspects of the DDP 500 to include opening and closing of the cylindrical container (CC) 501 container halves 502&503, recharging DDP batteries 516 and drone batteries 618. In an inactive mode, DDP 500 contains drones 600 with CC sections 502&503 in the closed position and enclosing drones 600 from the outside environment. While the DDP 500 is in the inactive mode, the docking plate recharging pads 512 makes electrical contact with the first drone 600 recharging pads 613 and corresponding second drone, third drone, etc. allowing all drone batteries to recharge. Upon activation, CC sections 502&503 opens to fully exposing drones 600, the top drone 600 motors 607 and propellers 606 start to allow drone 600 takeoff. Once the top drone 600 takeoff is complete, the next top drone 600 motors 607 and propellers 606 start to allow drone 600 takeoff, then the next top drone 600 and so on until all drones 600 are deployed. Upon drone 600 return, drone 600 autonomously positions itself above DDP 500 for landing, verifies proper orientation with using distinguishing marks 513 on docking plate 510, then descends to the docking plate 510 where the plurality of recharging pads 613 make contact with plurality of docking plate recharging pads 512, this process is repeated until all the drones 600 have securely docked. Once secure, CC sections 502 and 503 close to cover the drones 600 and enclose them from the outside environment and DDP 500 reverts to an inactive mode where drones 600 remains until the next drone 600 activation after all drone batteries 618 are fully recharged.

FIG. 1 shows a side sectional view of the DDP 500 in the closed position, comprising cylindrical container CC 501 comprising DDP enclosure base 505 and CC sections 502 and 503 that can be mounted on the top of a support pole 400. The CC 501 comprises two cylindrical half sections 502 and 503 to form a cylinder to include a top curved portion each having an edge 504. CC sections 502 and 503 are attached to hinges 506 which are attached to an actuator rod 507 which is attached to an actuator motor 508 and may be rotated with an actuator motor 508 into a fully closed position as seen in FIG. 1, or rotated into an open position exposing the docking base 505 and docking plate 510 and all stacked drones 600 to the outside environment. As CC sections 502 and 503 transition from an open position to a closed position, the CC section edge 504 contains a weatherproof barrier and when the two halves are fully rotated and completely closed, the CC section edge 504 will be completely sealed from the exterior environment. DDP 500 interior consists of a docking plate 510 that assists drone 600 landing or docking, base plate 505 with CM 515, DDP batteries 516, and DDP air conditioning unit 517, support rods 514 affixing docking plate 510 and base plate 505 as an assembly. The base plate 505 is attached to an inverted cone support structure 520 and the support structure 520 sits on and is attached to a support pole top 400. The support structure 520 contains an optional traffic flow sensor system 530 comprising EO/IR cameras, Lidar/Radar/acoustic sensors and advanced processor technology.

Figure 2:
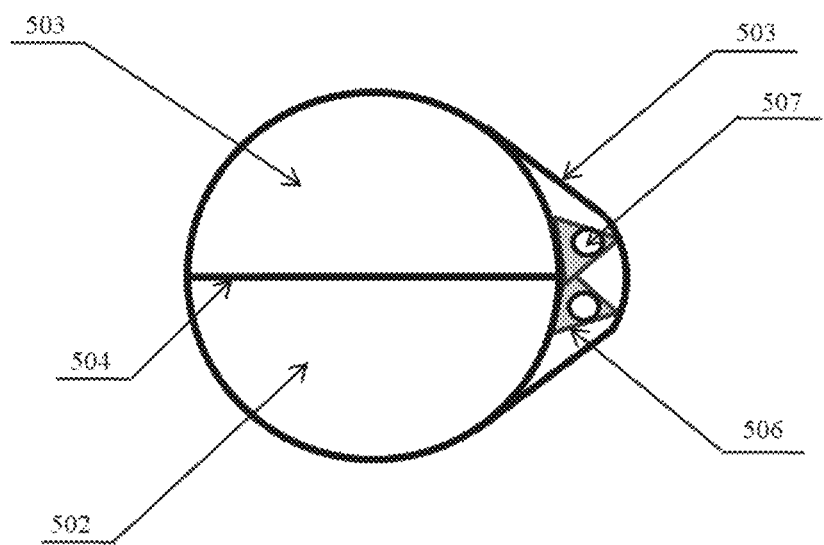
FIG. 2 is a top sectional view of the DDP and CC in the closed position.

FIG. 2 shows a top view of the DDP 500 in the closed position with CC sections 502 and 503 with edges 504 forming a weatherproof seam and attached to hinges 506 which are attached to actuator rods 507 to allow DDP 500 opening and closing.

Figure 3:
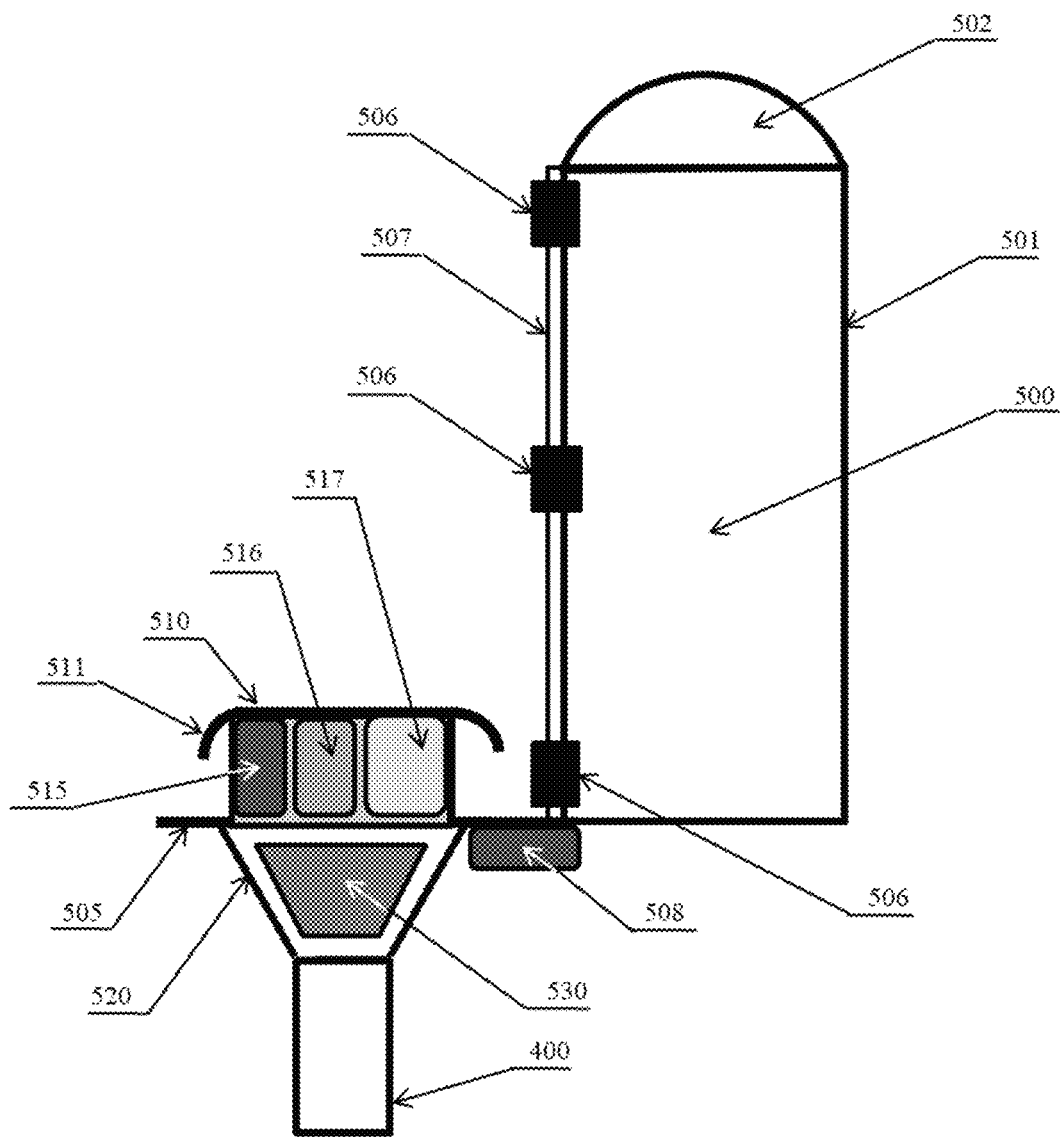
FIG. 3 is a side sectional view of the DDP to include the CC in the open position.

FIG. 3 shows a side sectional view of the DDP 500 in the open position, comprising cylindrical container CC 501 comprising DDP enclosure base 505 and CC sections 502 and 503 that can be mounted to an inverted cone support structure 520 which in turn can be mounted on the top of a support pole 400. The CC 501 comprises two cylindrical half sections 502 and 503 to form one half of a cylinder to include a top curved portion each having an edge 504. CC sections 502 and 503 are attached to hinges 506 which are attached to an actuator rod 507 which is attached to an actuator motor 508 and may be rotated with an actuator motor 508 into a fully open position as seen in FIG. 3, exposing the docking base 505 and docking plate 510 and all stacked drones 600 to the outside environment, or rotated into a closed position. As CC sections 502 and 503 transition from a closed position to an open position, the CC section edges 504 decouple breaking the weatherproof barrier and exposing the stackable drones 600 to the outside environment, when the two halves are fully rotated and completely open, the drones 600 may be deployed.

Figure 4:
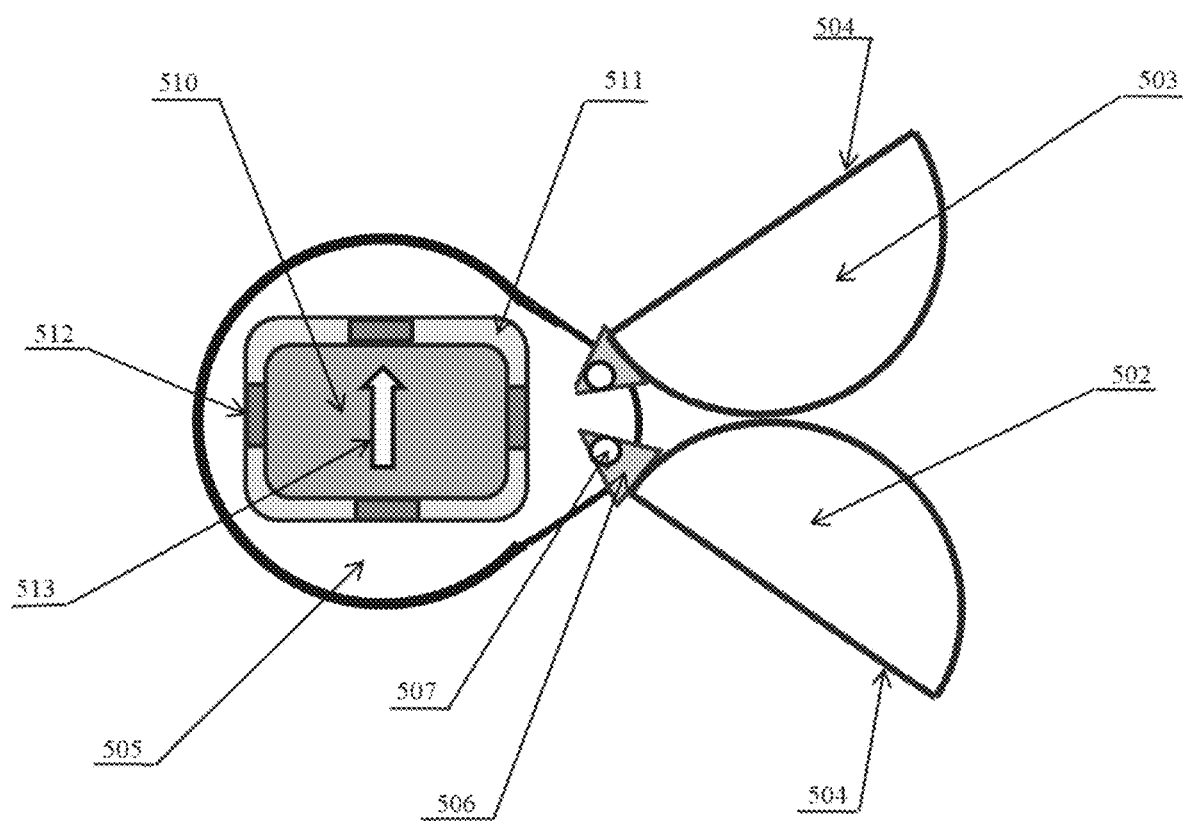
FIG. 4 is a top sectional view of the DDP and CC in the open position.

FIG. 4 shows a top view of the DDP 500 in the open position with CC sections 502 and 503 in the fully open position and attached to hinges 506 which are attached to actuator rods 507 to allow DDP 500 opening and closing and when open exposing the base plate 505, docking plate 510, docking plate curved surface 511, recharging pads 512, and docking plate markings 513 to the outside environment.

Figure 5:
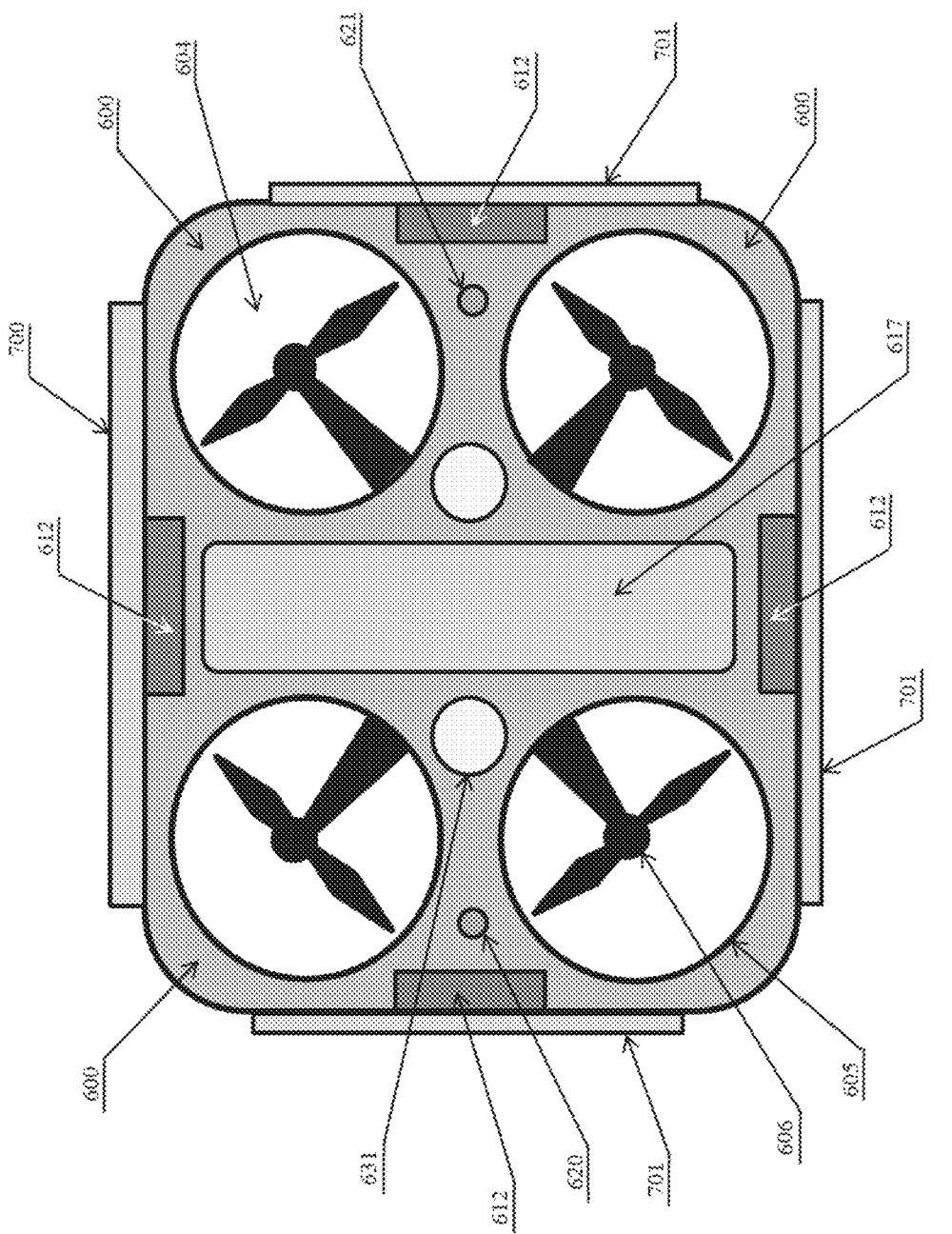
FIG. 5 is a top view of the drone with LED Panel Modules (LPM)

FIG. 5 shows a top view of the drone 600 comprising ducted fans 604, ducted fan tube and heat sink 605 propellers 606, drone control module (DCM) 617, recharging pads 612, Cameras EO/JR 620 and 621, LED lights 631, and mounted to the periphery—LED (RGYB-W) Panel Module (LPM) 700 and 701, all of which are weatherproof to the outside environment. The drone 600 top surface 610 is flat with curved surfaces 611 at the drone's 600 sides where recharging pads 612 are affixed and wrap around the drone's 600 bottom edge to the drone's 600 to the recharging pads 613 on the bottom curved surface 615. So that when docking, the drone's 600 bottom surface 614 and bottom curved surface 615 will easily drop or slide into position on the docking plate 510 and docking plate curved surface 511 making contact with docking plate 510 recharging pads 512 and drone's 600 recharging pads 613, or docked drone's 600 top surface 610 and top curved surface 611, making contact with the landed drone's 600 top recharging pads 612 with the landing drone's 600 bottom recharging pads 613. Once all the docked the drones 600 or stack of drones 600 are securely docked and mated, the DDP 500 CC 501 (enclosure) closes and the drones 600 batteries 618 are recharged. The DCM 617 controls all aspects of the drone flight to include autonomous flight and communicates with the attached LPMs 700 and 701, DDP 500. The DDP 500 in turn communicates with a central monitoring center and/or emergency personnel located at the scene via remote control units 390 or personal cell phone apps. High resolution EO/IR cameras 620 and 621 pointed upwards for obstacle avoidance or overhead inspection, and assisted by LED light 631 illumination. Mounted on the drone periphery is an LPM 700 and zero to three LPM 701s (depending on highway type) providing traffic signal light control to vehicles and signal codes transmitted directly to vehicles equipped to accept signal codes in an emergency situation or to guide traffic around an incident or accident. For example, when implemented on freeways or other divided highways, drones 600 with a single LPM 700 may be employed, as traffic incidents generally occur in one direction, thus traffic control would be from one direction. When implemented near intersections, a drone 600 with one LPM 700 and three LPM 701s should be employed as traffic incidents occurring at intersections, particularly at intersections without traffic signals, would require control in four directions, and for intersections with traffic signal control, during power outages or traffic signal outages a drone 600 with one LPM 700 and three LPM 701s would assist traffic control until the outage is resolved. The LPM 700 is considered the Master LPM and issue commands to the LPM 701s in order to switch traffic signal lights in a coordinated, synchronous fashion.

Figure 6:
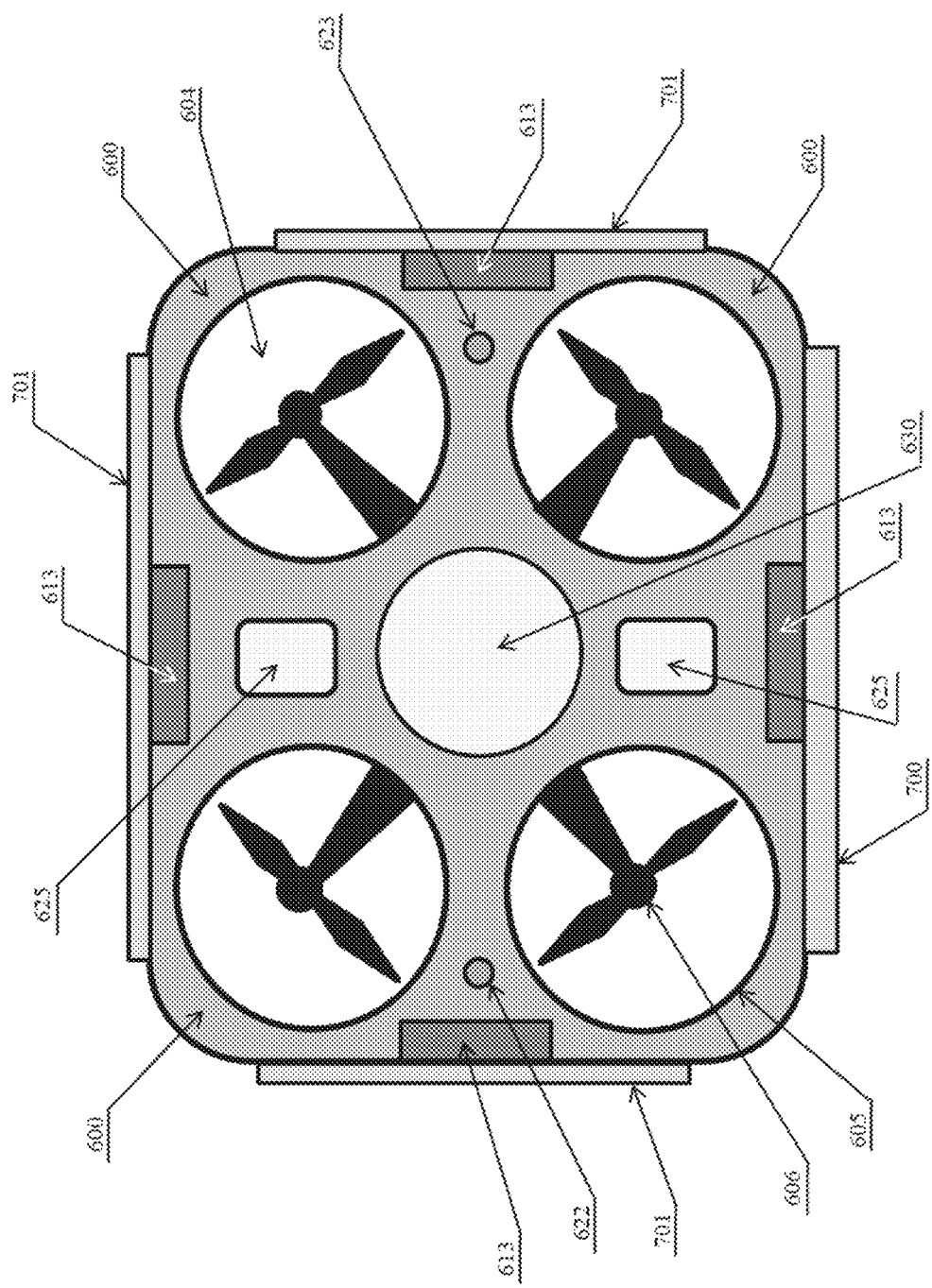
FIG. 6 is a bottom view of the drone with LED Panel Modules (LPM)

FIG. 6 shows a bottom view of the drone 600 comprising ducted fan 604, ducted fan tube heat sink 605, propellers 606, recharging pads 613, EO/IR cameras 622 and 623, Lidar/Radar/Ultrasonic sensors 625, large LED light 630, and mounted to the periphery—LED (RGYB-W) Panel Module (LPM) 700 and 701, all of which are weatherproof to the outside environment. Ducted fan tube heat sink 605 consist of a metal tube and acts a high efficiency heat sink, particularly with high velocity air being driven over the ducted fan tube's 605 surface by propellers 606. Heat generating components internal to the Drone 600 or DCM 617 can be dissipated through the ducted fan tube heat sink 605. High resolution EO/IR cameras 622 and 623 pointed downwards for drone 600 geo location, accident scene observation and investigation, obstacle avoidance and docking maneuvers, and assisted by LED light 630 illumination. Optional Lidar/Radar/Ultrasonic sensors are provided to aid in drone 600 situational awareness, flight maneuvering around obstacles, accident observation and investigation data, returning to the DDP 500, hovering and docking. Mounted on the drone periphery are LPM 700, and zero to three LPM 701s (depending on highway type) providing traffic signal light control to vehicles and signal codes transmitted directly to vehicles equipped to accept such signal codes in an emergency situation or to guide traffic around an incident or accident.

Figure 7:
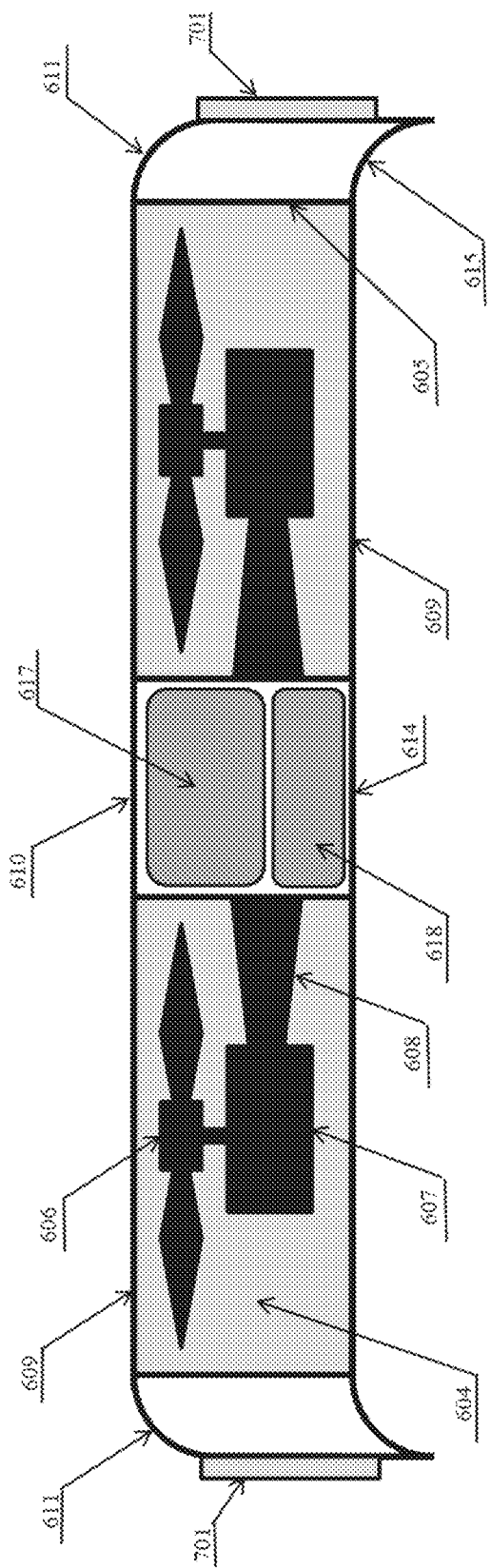
FIG. 7 is a side sectional view of a drone.

FIG. 7 shows a side sectional view of a drone 600 comprising ducted fan 604, ducted fan heat sink 605, propellers 606, propeller motor 607, propeller motor mount 608, protective screens 609 over and below each propeller 606 to keep foreign objects away from propellers 606, drone top surface 610, drone top curved surface 611, drone bottom surface 614, drone bottom curved surface 615, drone control module (DCM) 617, drone batter pack (DBP) 618, and LPM 701s, all of which are weatherproof to the outside environment. The top surface 610 and top curved surface 611 of one drone 600 is the same in shape and allows mating with an above second drone's 600 bottom surface 614 and bottom curved surface 615 and easily drop or slide into position on the docked drone's 600.

Figure 8:
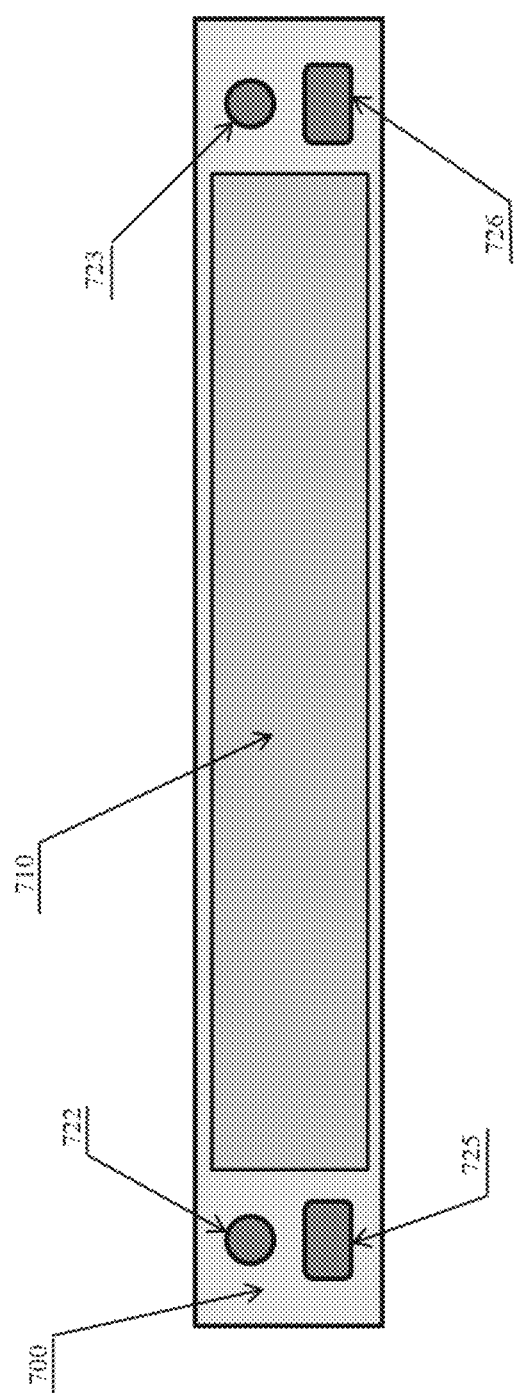
FIG. 8 is a front view of an LED Panel Module (LPM)

FIG. 8 shows a front view of an LPM 700 as a master controller for LPMs 701 as slave LPMs (LPM 701 has the same front view without the Lidar/Radar/Ultrasonic Sensors 725 and 726), is weatherproof to the outside environment, and consists of a large multicolored LED light panel 710 displaying Red, Green, Yellow LED traffic signal lights, Blue LED beacon light and white LED lights to assist emergency personnel, provides commands to switch traffic signal lights from Red to Green to Yellow and sends a traffic signal control code to other LPM 701s via wired or wireless control to synchronously switch all LPM 701s LED light panel 710 displays. Where Green or Yellow signal lights are displayed in two opposing directions and a Red signal light in a 90 degree opposing directions. The LPM 700 also provides traffic signal codes transmitted directly to vehicles equipped to accept such signal codes to guide equipped vehicles around an incident or accident (i.e. autonomous vehicles). The LPM 700 contains an EO/IR stereo camera pair 722 and 723, fixed and pointing outward to observe a traffic flow, accident or incident and used to collect investigative data. The LPM 700 also contains an optional Lidar/Radar/Ultrasonic Sensors 725 and 726 or any combination of Cameras, Lidar, Radar and/or Ultrasonic Sensors to precisely detect location, distance, speed and size of oncoming vehicles, and to assist in safely and efficiently directing them around an accident or incident.

Figure 9:
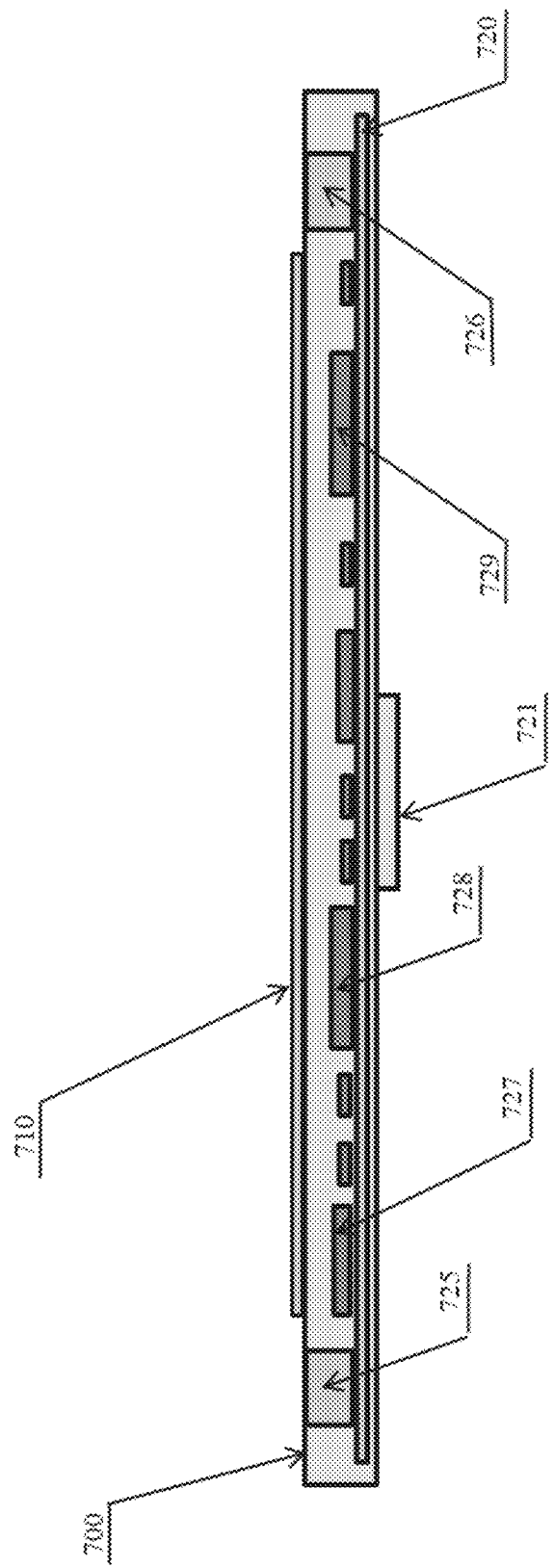
FIG. 9 is a side sectional view of an LED Panel Module (LPM)

FIG. 9 shows an edge view of an LED Panel Module (LPM) 700. LPM 700 comprises a weatherproof housing with an LED light panel 710 affixed to the front, cameras 722 and 723, Lidar/Radar/Ultrasonic sensors 725 and 726, a video processing unit 727, a digital signal processing unit 728 and a neural network 729 affixed to a circuit board 720 within the LPM 700 and with appropriate power, input and output capability through a multi-pin connector 721 attached to the circuit board, protruding through the housing with a weatherproof seal around the connector and connected to a mating connector as located on each side of the drone 600.

Figure 10:
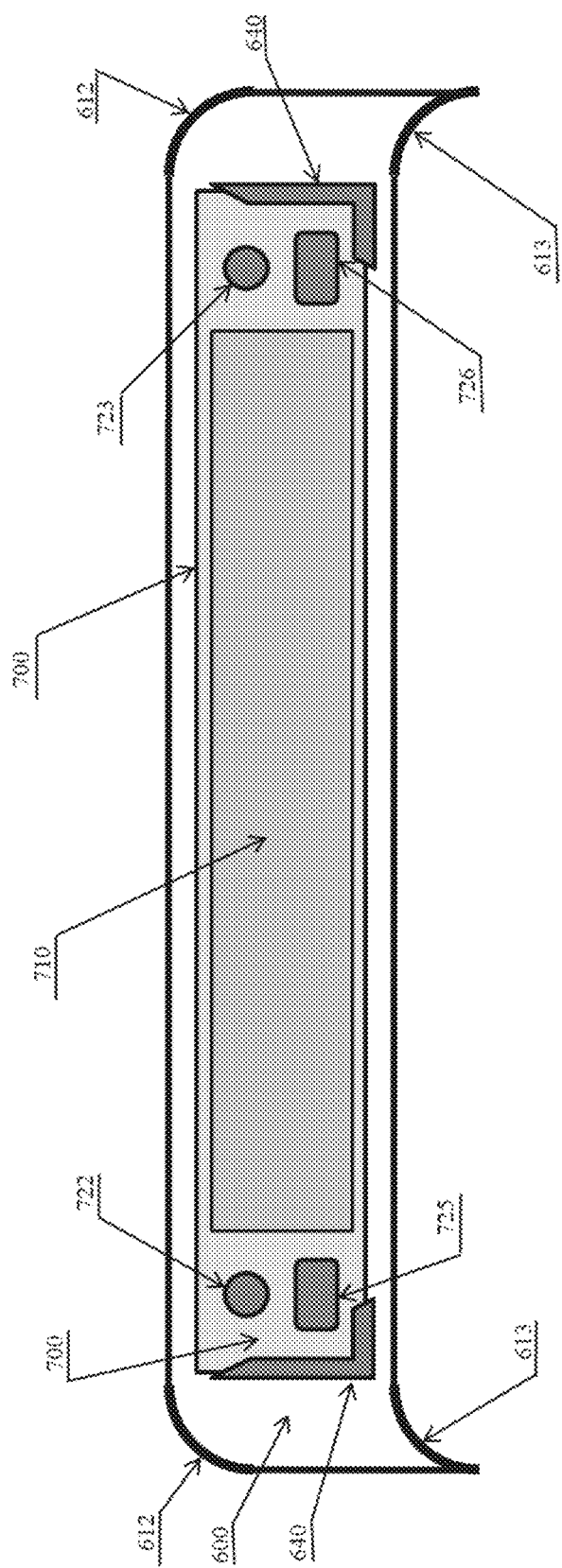
FIG. 10 is a front view of an LPM mounted on the side of a drone.

FIG. 10 shows a side view of a drone 600 with recharging pads 612 and 613 on the drone's 600 top and bottom curved surfaces 611 and 615, LED light module holder 640 and a front view of an LPM 700 attached to the drone 600 with an LED light module holder 640 so that an LPM 700 and 701 may be inserted, firmly affixed to the drone 600. The LPM 700 contains a large multicolored LED light panel 710, an EO/IR stereo camera pair 722 and 723, and Lidar/Radar/Ultrasonic Sensors 725 and 726. An LPM 700 is employed on all drone 600s particularly deployed for freeways and highways with one directional traffic flow patterns and one to three LPMs 701 are employed on drones deployed for more than one directional traffic flow pattern as in traffic intersections.

Figure 11:
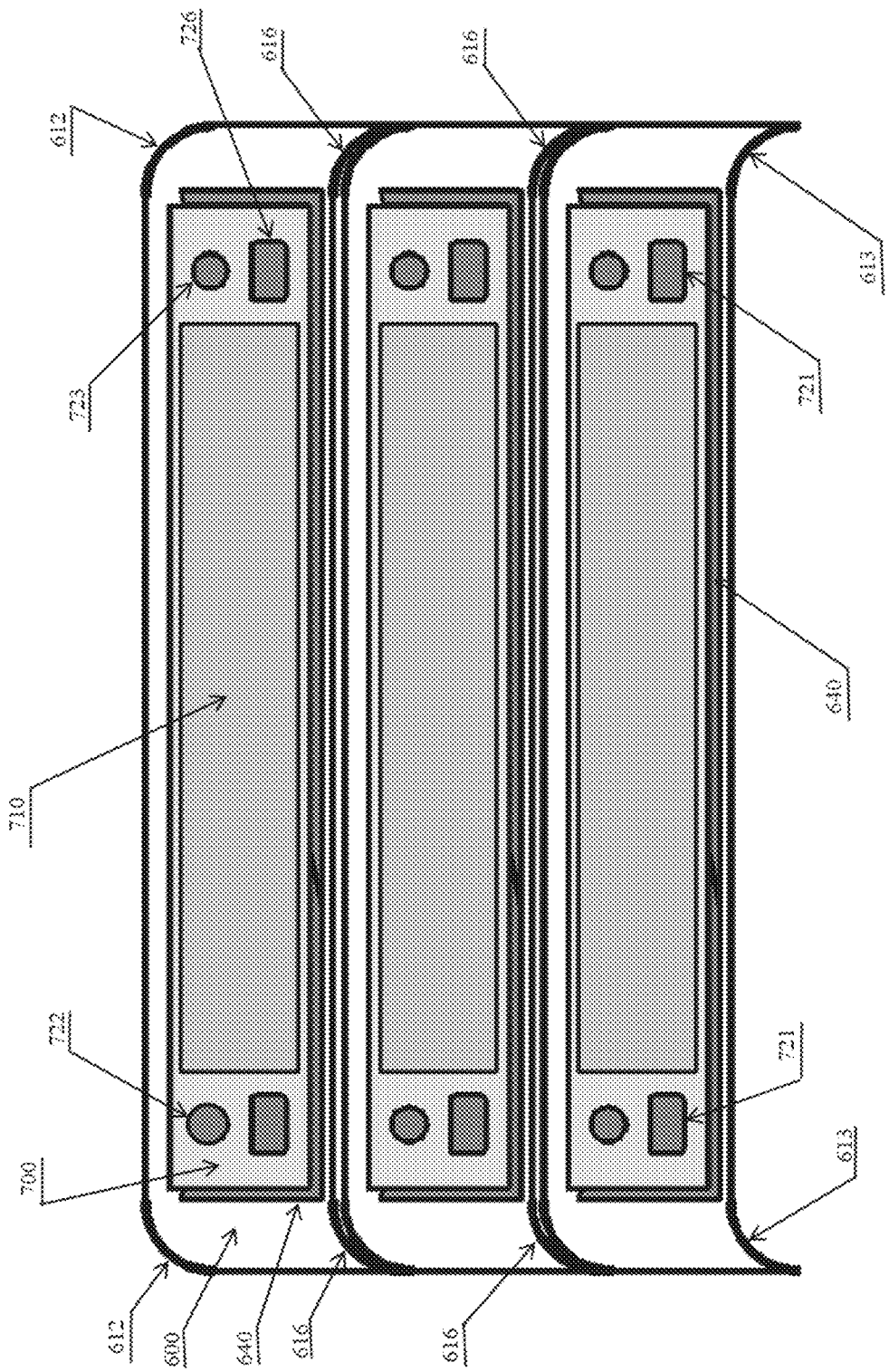
FIG. 11 is a front view of multiple LPMs mounted on multiple or stacked drones.

FIG. 11 shows a stack of three drones 600 with recharging pads 612 and 613, LED light module holder 640 and front view of LPMs 700 attached to drones 600 with an LED light module holder 640. The LPM 700 contains a large multicolored LED light panel 710, an EO/IR stereo camera pair 722 and 723, and Lidar/Radar/Ultrasonic Sensors 725 and 726. Bottom drone 600 has a middle drone 600 in docked position, making contact 616 with recharging pads 612 and 613. The middle drone 600 has a top drone 600 in docked position, making contact 616 with recharging pads 612 and 613 to complete a stack of drones 600.

Figure 12:
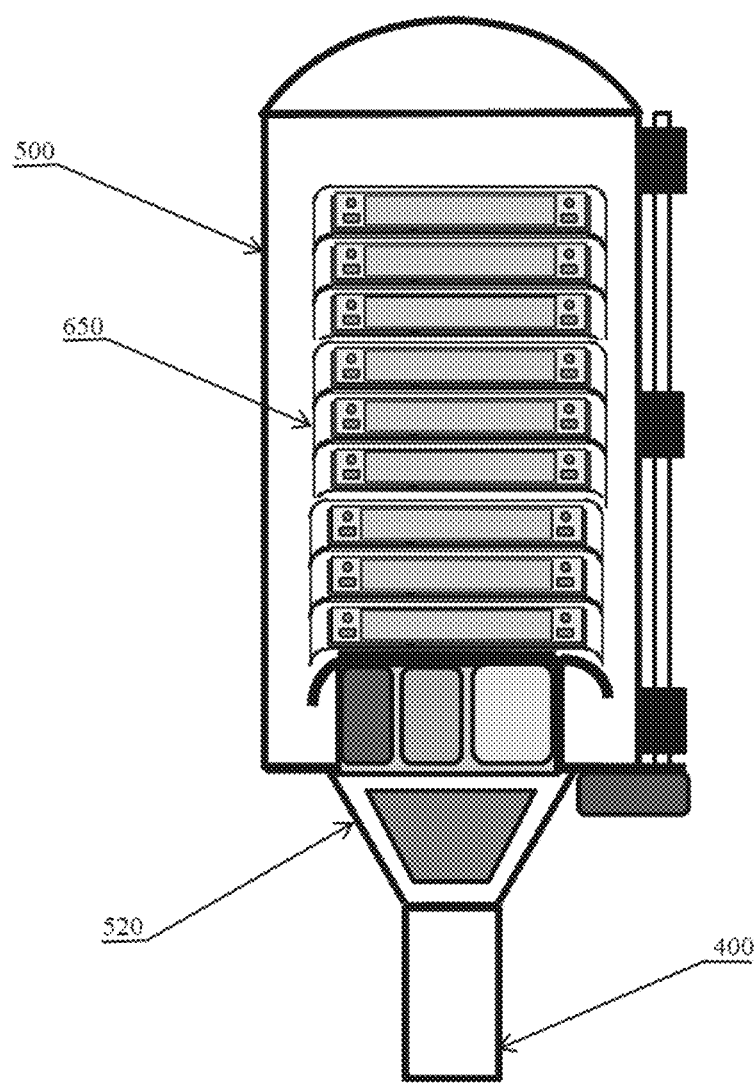
FIG. 12 is a side sectional view of a DDP to include stackable drones within the CC in the closed position.

FIG. 12 shows a side sectional view of a DDP 500 with CC 502 and 503 in the closed position with a stack 650 of docked drones 600, atop an inverted support cone 520, atop a pole 400.

Figure 13:
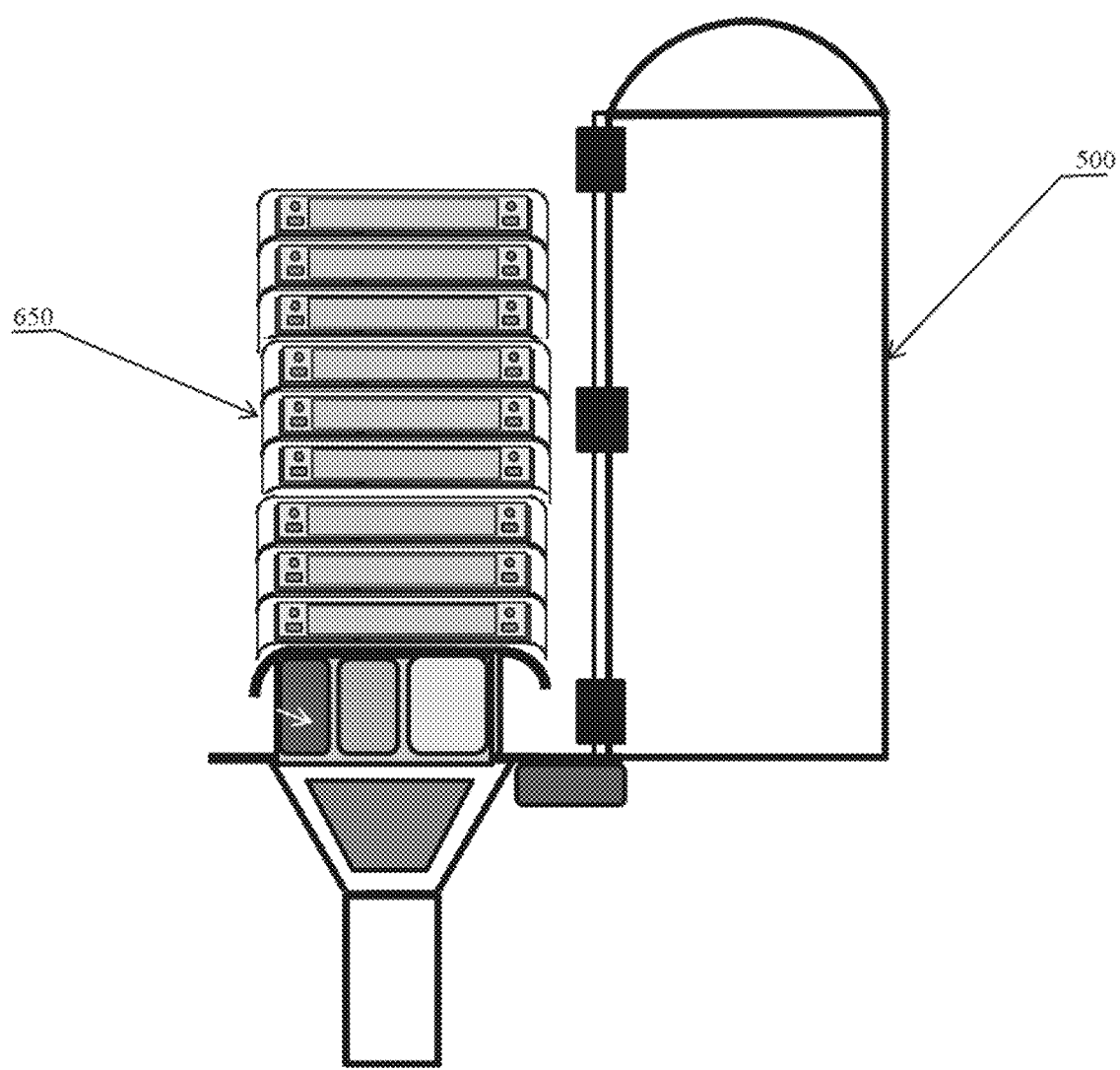
FIG. 13 is a side sectional view of a DDP to include stackable drones within the CC in the open position.

FIG. 13 shows a side sectional view of a DDP 500 with CC 502 and 503 in the open position with a stack 650 of docked drones 600, ready to take off.

Figure 14:
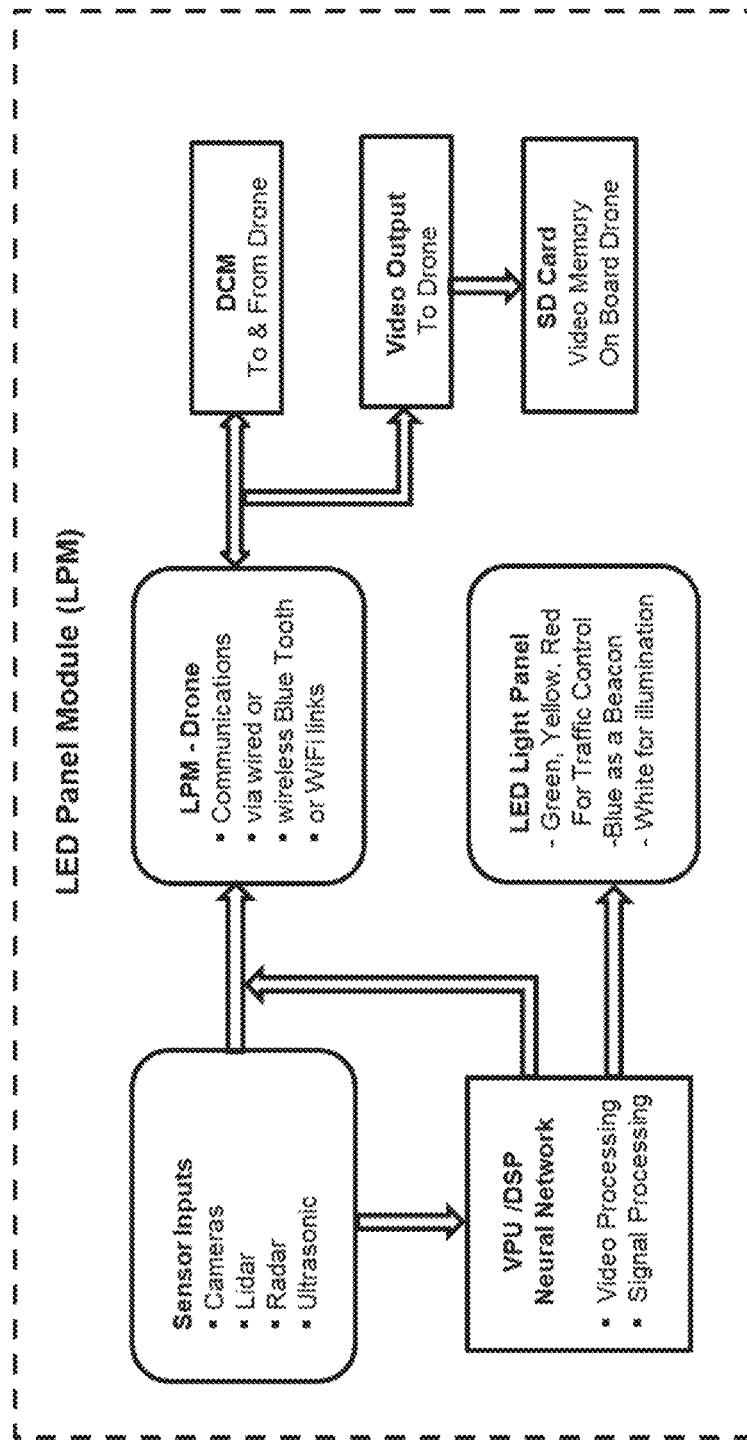
FIG. 14 is a block logic diagram of an LED Panel Module (LPM)

FIG. 14 shows a block diagram of an LED Panel Module (LPM) 700, with Sensor Inputs, VPU (Video Processing Unit), DSP (Digital Signal Processor) and Neural Network, LPM-Drone communications, LED Light Panel, DCM, Video Output and SD Card Blocks. LPM 700 Sensor Input data from Cameras 722&723 video and Lidar, Radar and/or Ultrasonic sensor 725&726 data are processed with a video processor 727, digital signal processor (DSP) 728 and neural network 729. Video data, light commands and flight control instructions are transmitted to and from the LPM 700 to other on-board LPM 701s for LED signal light switching, and to the drone 600 and drone control module (DCM) 617 for video recording and flight control for precise drone 600 maneuvering.

In operation, the video processing unit 727 and DSP unit 728 provides feature extraction and other video or signal processing techniques and outputs this data to a neural network 729. The neural network uses the video and DSP processing unit data and/or has the ability to input and process raw video and DSP data, and provides detection, recognition, classification and tracking of objects, like people, bicycles, cars, trucks, etc., so that when an accident occurs, the LPM 700 on a drone 600 can detect obstacles on the way to an accident scene and provide instructions to the drone control module (DCM) 617 to avoid those obstacles, and once at the scene, the drone 600 and LPM 700 can immediately communicate, determine severity, and provide some level of comfort to the accident victims, communicate this status to a central monitoring center, then perform a thorough investigation of the accident scene with video and/or Lidar, while other drones are performing different modes of the accident scene operation. One of the modes, directing traffic around the accident or incident in a safe, efficient manner by implementing the LED light panel 710 on the LPM 700 and/or 701 as a traffic signal light changing from green to yellow to red for a direction of traffic. For example, a freeway with four lanes would have four drones 600 immediately fly a sufficient distance away from the accident with a drone above each lane and initially displaying a Red LED light to stop all vehicles, then when safe, a drone in a first lane will display a Green LED light allowing multiple vehicles in a lane to pass with Red lights on all other lanes, then display a Yellow LED light, then a Red LED light for cars in the lane to stop. A drone in a second lane displays a Green LED light and the process continues with the third and fourth lanes, then the process is repeated until the accident is cleared. In addition to the LPM 700 switching the LED light signals, personnel at the central monitoring center and first responder personnel or police can take over drone 600 control and LPM 700 LED light signal control to maneuver and switch LED light signals as appropriate. Another mode would have one or more drones positioned from the drone 600 stopping point to the accident displaying Green LED lights to direct traffic around the accident in a safe, efficient manner. Another drone would display a Blue LED light and fly high above the accident and act a beacon to let drivers and first responder personnel know of the accident location to give them an idea of time they have to wait for normal traffic flows. When accidents occur at night, another drone in the stack of drones would be deployed displaying a bright White LED light and fly at a safe distance over the accident to assist emergency personnel clearing the accident scene.

Upon a low battery alert or when the accident operations are complete and the drones 600 return to the DDP 500, the drones with LPM 700s on board land in order of battery depletion and drones with LPM 700 and 701s on board are last to land as these are the drones that perform accident scene investigation with master LPM 700 and slave 701s and should be the first drones to deploy from the DDP upon the next incident after batteries are recharged. When drones return to the DDP to dock and recharge batteries, other drones from the DDP stack of drones, other DDPs or drones in Emergency vehicles will take their place and resume their modes of operation. In the event of a malfunction, a malfunction signal or code will be sent to the central traffic control monitoring center for resolution.

The LPM 700 vision processing unit (VPU) and neural network are key components within the LPM 700 as manufactured by INTEL, NVIDIA, QUALCOM, GENERAL VISION and others as used for processing. INTEL has a several vision processing unit chips, including one that features a neural compute engine with 16 core processors each providing the ability to perform separate pipeline algorithms, sensor fusion and/or convolution neural networks all in a low power chip suitable for battery operation. The neural compute engine portion adds hardware accelerators designed to dramatically increase performance of deep neural networks without including the low power characteristics of the chip. Known software and algorithms will be applied to this chip or others to detect, recognize and analyze vehicles, vehicular incidence and/or accidents, vehicles in a traffic lane, as well as drone 600 position and orientation to provide flight controls to precisely dock a drone 600. INTEL and GENERAL VISION both have low power chips that perform RBF (Radial Basis Function) neural networks in real time and can be considered fast learning (as opposed to deep learning) processors. GENERAL VISIONS's chips have 576 neurons with low power characteristics in a very small package, where each neuron consists of a processor and memory. Neurons can be configured in parallel or hierarchical and suitable for fast or real time learning and provides real time image or signal detection, classification and recognition. These processors (chips) are taught and not necessarily programmed, so programming is simplified and known by technologists in that field. Furthermore, GENERAL VISTON's NEUROMEM Technology can be implemented in Field Programmable Gate Array (FPGA) chips and has been previously implemented on INTEL chips and vision sensor die from OMNIVISTON as a single chip camera solution.

Sensor data that is processed on neural network architectures, designed specifically around the Radial Basis Function (RBF) or K Nearest Neighbor modes of operation, can be considered an expert system, which recognizes and classifies objects or situations and makes instantaneous decisions, based on accumulated knowledge. It accumulates its knowledge 'by example' from data samples and corresponding categories. Its generalization capability allows it to react correctly to objects or situations that were not part of the learning examples. The learning capability of an RBF neural network model is not limited in time, as opposed to some other models. It is capable of additional learning while performing classification tasks. The RBF mode of operation allows for instant "learning on the fly". As an example, tracking a vehicle, an operator can select an object to be tracked by placing a region of interest (ROI) around the object and selecting this region with a mouse click while neural network is in its learning mode, feature extraction algorithms may be applied (neural network can work with raw data or feature extracted data), data from the ROI will be loaded into the memory block automatically and sequentially (requiring from one to a multitude of neurons), thus training neural network from a single frame of imagery and in real time. Once learned, neural network will input the second frame of imagery, compare data from the entire frame with the neuron memory contents, find a match, classify the match, and provide an X-Y (coordinates) position or location output. This X-Y output will allow an associated pan and tilt mechanism to track the object of interest in real time. This process continues for each successive frame. In the event the vehicle turns or changes shape in relation to the camera location, the degraded quality of the neuron memory comparison will trigger the neural network learning mode to capture this changed data and commit more neurons for the new object shape. This neural network will simultaneously and continuously track the object, allowing itself the ability to track even as new patterns are learned.

Artificial Intelligence (AI) solutions today typically require high performance computers and/or parallel processors running AI or neural network software performing "Deep Learning" on back propagation and other neural networks. These systems can be large, consume significant power and be very costly for both the hardware and software. The learning phase for Deep Learning neural networks is generally performed in data centers or the "Cloud" and takes huge computing resources that can take days to process depending on the data set and number of levels in the network. After the network has been generated it can be downloaded to relatively low power processing systems (Target Systems) in the field. However, these target systems are typically not capable of embedded learning, and generally consist of powerful PCs and GPU (Graphic Processing Unit) acceleration resulting in significant cost and power consumption. Additionally, as the training dataset grows during the learning phase, there is no guarantee that the target hardware will remain sufficient and users may have to upgrade their target systems to execute properly after a new network has been generated during the learning phase. The major limitation to this approach is that new training data cannot be incorporated directly and immediately in the executable knowledge. It often also requires a fair amount of hand coding and tuning to deliver useful performance on the target hardware and is therefore not easily portable. Unlike Deep Learning networks, the neural network based on RBF networks can be easily mapped on hardware because the structure of the network does not change with the learned data. This ability to map the complete network on specialized hardware allows RBF networks to reach unbeatable performances in terms of speed and power dissipation both for learning and recognition. Preferably, the neural network has a NeuroMem™ architecture.

For traffic flow determination, low and constant latency is a very desirable feature as it guarantees high and predictable results. With Deep Learning, latency varies. Typically, the more the system learns, the slower it becomes. This is due to the Von Neumann architecture bottlenecks found in all computers which run sequential programs. Even the most modern multi-core architectures, even the best GPU or VPU architectures have limitations to their parallelism because some resources (cache, external memory access, bus access, etc.) are shared between the cores and therefore limit their true parallelism. The NeuroMem™ architecture goes beyond the Von Neumann paradigm and, thanks to its in-memory processing and fully parallel nature does not slow down when the training dataset grows. In fact, any environment which needs on-the-job learning, fast and predictable latency, easy auditing of decisions is likely to be better served by RBF neural networks, rather than by Deep Learning neural networks.

Figure 15:
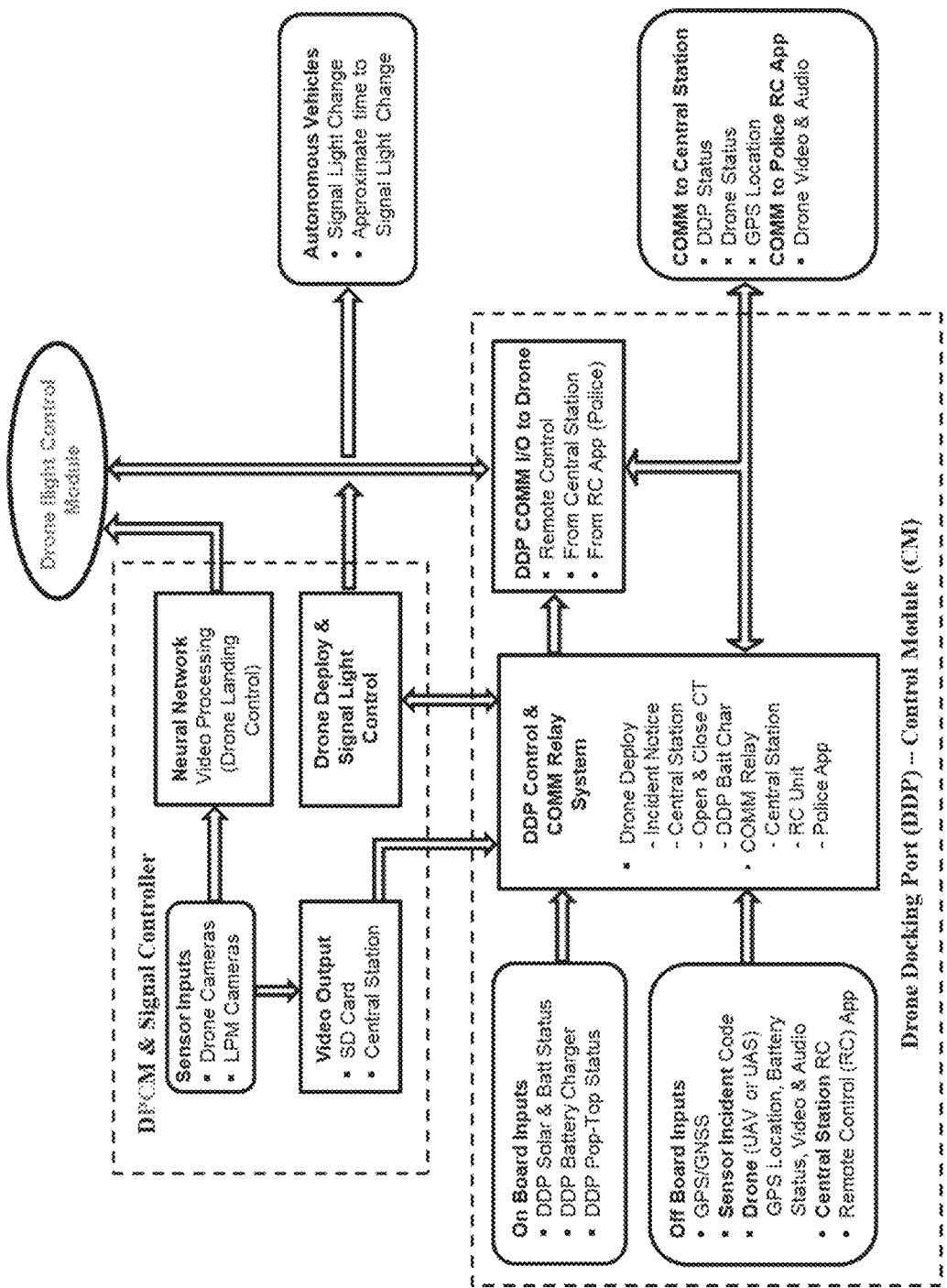
FIG. 15 is a block logic diagram of a DDP with CM.

FIG. 15 shows a block logic diagram of DDP 500, CM 515 The DDP 500 contains CM 515 that controls all aspects of the DDP 500 to include: DDP enclosure or CC 501 opening and closing, DDP battery pack 516 recharging, drone battery 618 recharging and communications capabilities from other traffic sensor systems, central monitoring stations, first responder personnel and to act as a relay communications device to the drone in flight and/or other drones in flight in the near vicinity. CM 515 would relay video signals to the central monitoring center and provide for video recording at or in close proximity to the CM 515. CM 515 would also relay flight or camera control signals and audio commands from the central monitoring center to the drone 600 in flight, giving central monitoring center personnel the ability to override autonomous drone flight control should they desire. For example, CM 515 receives a traffic alert from a Traffic Flow Sensor System (TFSS) of a nearby traffic accident. The TFSS is a separate device and consists of an EO/IR camera, stereo camera pair, lidar and/or radar sensors and any combination thereof to detect and monitor traffic flow and abnormal traffic flow to include traffic incidence. Upon the TFSS issuing a traffic alert of an incident or accident, CM 515 initiates a signal to a central monitoring center, and the FAA for flight approval. Once approved, CM 515 signals DDP 500 to open the DDP enclosure CC 501 and when open to start the drone propellers 606 and commence autonomous drone flight—to takeoff, fly to and hover over the accident, take photographs and videos of the scene and assist in accident scene forensics and to assist police in clearing the scene more rapidly, so as to resume normal traffic flow. Central monitoring center personnel have the ability to override the autonomous drone control at any time to aid in the resolution and clearing of traffic incidence. Designated emergency personnel with first-hand knowledge of the incident would also have the ability to override the autonomous drone control at any time to aid in the resolution and clearing of traffic incidence through their remote control devices or cell phone apps at the incident scene. LPM 700 LED signal light controller also communicates directly with autonomous or semiautonomous vehicles for a signal light status or change. The communication is selected from the group consisting of a Bluetooth communication, LoRa Communication, an internet communication, a cell phone network communication (4G/5G), an independent intranet network communication, an RF communication, a wired communication, or an optic fiber communication. Preferably, the data, video, audio and remote control commands are communicated or streamed in real time with very low latency in both directions—to and from the deployed drone 600, DDP 500 and central monitoring center. In the event of a malfunction, a malfunction signal or code will be sent to the central traffic control monitoring center for resolution.

Figure 16:
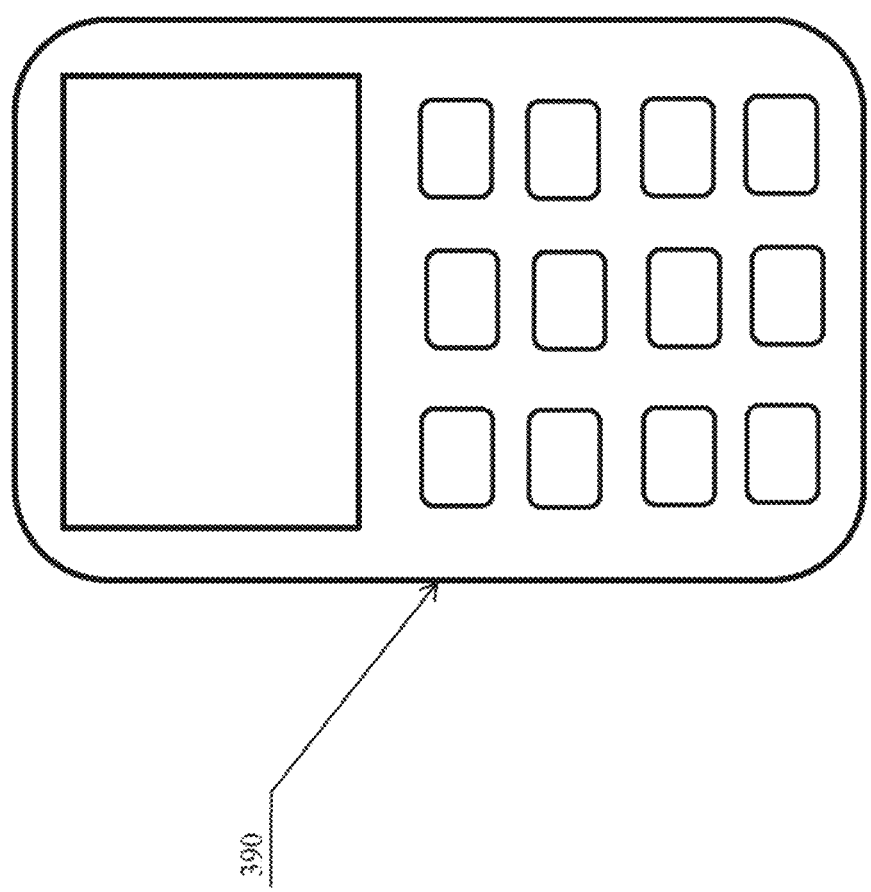
FIG. 16 is a remote control unit.

FIG. 16 shows a Remote Control Unit (RCU) 390 in another embodiment.

As explained above, various embodiments of the present invention use similar technology as implemented in consumer drones or cell phones with very small, lightweight, low power and low price (SWAP) components and powered by solar panels and rechargeable batteries. Coupled with LED's as traffic signals and overhead lighting, drone deployment from drone docking ports could substantially reduce the time and costs involved in resolving traffic incidents or accidents at the scene, direct traffic around the accident more efficiently, saving drivers time, fuel and cost and potentially save lives.

An advantage of the disclosed drone docking port is the ability to place (especially autonomous) drones in strategic locations along highways or traffic intersections conducive to rapid deployment to incidents, events and/or traffic accidents as first responders. These autonomous drones would reside in their drone docking ports until an incident arises, then be deployed, providing emergency and central monitoring center personnel live video of the scene with the ability to provide two way audio to injured or other persons, then to aid emergency personnel in directing vehicle traffic efficiently and safely around an incident and resolving the incident in a timely fashion.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A drone docking port (DDP) for use in providing a docking port for an unmanned aerial vehicle (drone) enabled to automatically perform takeoff, mission accomplishment, landing, and post-landing battery recharging, the DDP comprising an enclosure having two cylindrical halves attached with hinges to two DDP support and actuator rods, with a weather strip affixed to an opening or closing edge and around a DDP base plate, wherein the support and actuator rods are activated by an opening or closing motor, wherein the two DDP support and actuator rods, opening or closing motor and docking plate support rods are attached to DDP base plate, a control module, and a battery pack are affixed to the top portion of the DDP base plate and underneath a docking plate, wherein the base plate is affixed to the top of a DDP inverted support cone and includes a battery charger and optional traffic flow sensor system functionally mounted therein, wherein when the enclosure is closed with the weather strips being in a compressed weather sealing state and a DDP inner cavity being formed thereby and being substantially sealed from an external weather environment, and wherein the DDP is adapted such that when the motor actuates to move the enclosure from a closed position to an open position, the motor causes the two cylindrical halve members to rotate until the enclosure is opened with the weather strips being in an uncompressed non-weather sealing state and the DDP being in a drone receivable and drone launchable state, and wherein opening the enclosure from a closed state occurs within 10 seconds, and wherein closing the enclosure from an open state occurs within 10 seconds, and wherein the DDP is adapted such that the enclosure is automatically positioned between a closed state and a fully opened state to a mid-state such that substantial weather protection is provided while also allowing the DDP inner cavity temperature to equalize with the DDP proximate external temperature, and wherein a degree of opening of such mid-state is automatically proportionate to the DDP proximate external temperature.

2. The DDP of claim 1, wherein the DDP includes a drone or multiple drones in a stack launchably and dockably retained therein.

3. The DDP of claim 1, wherein the DDP includes a drone docking plate mounted therein and having at least one charging pad thereon, the drone docking plate being adapted such that when drone contacts the at least one charging pad, at least one of wired charging and wireless charging of the drone is initiated.

4. The DDP of claim 3, wherein the drone docking plate comprises at least one of metal, plastic, fiberglass, and a combination thereof, and wherein the drone docking plate is formed in at least one of a circular shape, an oval shape, and a rectangular shape, and with curved edges, and wherein the drone docking plate includes a plurality of charging pads.

5. A docking structure comprising the DDP of claim 1 and an elevated elongate structure in near proximity to a target monitoring site, wherein the DDP is mounted on the elevated elongate structure.

6. The DDP of claim 1, wherein in response to a predetermined signal, the enclosure automatically opens and the drone automatically or autonomously flies to a target monitoring site.

7. A drone system comprising the DDP of claim 6 and the drone or multiple drones in a stack, wherein when the drone or multiple drones in a stack are at the target monitoring site, the drone or multiple drones in a stack performs at least one of the functions of recording video data of the target monitoring site, recording audio data of the target monitoring site, transmitting video data of the target monitoring site to a central monitoring station, transmitting audio data of the target monitoring site to a central monitoring station, receiving audio data from a central monitoring center, receiving non-audio data from a central monitoring center, directing traffic at the target monitoring site, providing a warning at the target monitoring site, illuminating the target monitoring site, and creating a light beacon over the target monitoring site.

8. The DDP of claim 7, wherein the data receiving from the central monitoring center comprises a drone override command.

9. The DDP of claim 1, wherein the battery pack is adapted to operate the DDP without external power or recharging for at least 36 hours, and wherein the battery pack is adapted to continuously recharge a drone battery for at least 2 hours.

10. The DDP of claim 1, wherein the DDP includes at least one of a solar panel adapted to recharge the battery pack, an air conditioning unit adapted to automatically control temperature and humidity inside of the DDP, a heating unit adapted to automatically control temperature and humidity inside of the DDP, a weather monitoring device adapted to monitor at least one of temperature, wind speed, humidity, rain, snow, ice, fog, and dust.

\* \* \* \* \*